3,179,716
CURING OF AN ISOCYANATO MODIFIED BLEND OF AN OLEFIN COPOLYMER AND AN UNSATURATED CARBOXYLIC ACID
Pieter Bruin and Theodorus Reinder Rix, Amsterdam, Netherlands, assignors to Shell Oil Company, New York, N.Y., a corporation of Delaware
No Drawing. Filed Dec. 9, 1960, Ser. No. 74,756
Claims priority, application Netherlands, Dec. 18, 1959, 246,557
8 Claims. (Cl. 260—878)

This invention relates to novel elastomer compositions and methods for producing them. More particularly, it relates to elastomers of monoolefinic copolymers.

In Irish patent application 695/56, published January 9, 1957, there are described processes for producing synthetic elastomers by the copolymerization of mono-alpha-olefins having up to six carbon atoms. The resulting copolymers, as the Irish patent application points out, are true copolymers as distinguished from physical mixtures of homopolymers. Further, the copolymers are characterized as being normally amorphous which, on stretching, crystallize. The crystallizable feature of the elastomers indicate that they may be useful, after vulcanization or curing, as synthetic rubbers. However, the Irish patent application does not disclose how the elastomers may be vulcanized and on considering the elastomeric copolymers in greater detail it will be seen that the means of accomplishing a cure of the elastomers is not readily apparent because they are free, or essentially free of ethylenic unsaturation. The lack of unsaturation means that, as a practical matter, there are no sites at which vulcanization can take place.

Other publications since then have dealt with methods of introducing vulcanizable sites into the elastomeric copolymer. One such proposal has been to carry out the processes for the production of the elastomeric copolymer in the presence of a third unsaturated monomer, as acetylene, and in that way the third unsaturated monomer would interpolymerize to introduce vulcanizable unsaturation into an elastomeric copolymer. This technique, however, has not be demonstrated to be operable or suitable. Still other techniques have been proposed but in the final analysis, the performance of the final vulcanized elastomer is criterion of suitability. The present invention provides suitable vulcanizates of synthetic elastomer of mono-olefin copolymers.

In this description whenever reference is made to "elastomeric copolymers of mono-olefins" or words of similar meaning, it is to be understood that reference is had to copolymers of at least two olefins of the formula

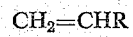

where R is hydrogen or an alkyl radical having up to four carbon atoms. Representative mono-olefins include ethylene, propylene, butene-1, pentene-1, hexene-1, 4-methyl-pentene-1, and the like. Representative elastomeric copolymers include ethylene-propylene, ethylene-butene-1, ethylene-pentene-1, propylene-hexene-1, and the like. In a preferred embodiment the elastomers are prepared with ethylene and one other mono-olefin having up to six carbon atoms and particularly preferred are the elastomeric copolymers of ethylene and propylene. For the sake of brevity and because the present invention applies equally to the elastomer copolymers of the type mentioned above, the invention will be described mainly as it relates to the most preferred embodiment of the ethylene-propylene elastomers.

It is an object of this invention to provide novel methods for vulcanizing elastomeric copolymers of mono-alpha-olefins. It is still another object of this invention to provide novel methods for vulcanizing elastomeric copolymers of mono-alpha-olefins, which elastomers are free or essentially free of ethylenic unsaturation. It is yet another object of this invention to provide novel compositions the vulcanizates of which exhibit the properties of useful rubber. Other objects will become apparent as the description of the invention proceeds.

These and other objects are accomplished by the method of vulcanizing elastomeric copolymers of mono-alpha-olefins having up to six carbon atoms, the copolymer being crystallizable on stretching and being essentially free of ethylenic unsaturation comprising (A) blending the elastomer with (1) a member selected from the group consisting of an organic peroxide, an organic hydroperoxide, and an organo-azo compound and (2) a member selected from the group consisting of an organic unsaturated carboxylic acid and an organic anhydride, the said blending being at temperatures up to 80° C., (B) reacting the said blend at temperatures up to 250° C., (C) recovering the product from (B) and mixing it with an isocyanate having more than one radical of the formula —N=C=X wherein X is a member selected from the group consisting of oxygen and sulfur, and a curing agent therefor. The resulting product may then be vulcanized by conventional means at temperatures ranging from about 80° C. to about 250° C. but it will be readily seen that the unvulcanized product need not be vulcanized immediately and in fact the product resulting from the combination of steps (A), (B) and (C) may be retained in storage indefinitely and subjected to vulcanization at another time and at a different location. For this reason the resulting product, prior to vulcanization, constitutes the novel compositions of matter of this invention.

The elastomeric copolymers, as previously indicated, may be prepared by the procedures and techniques described in Irish patent application 695/56 and those processes for the preparation of the elastomeric copolymers, and the copolymers themselves, form no part of this invention. However, for the sake of convenience the processes for producing the copolymers will be briefly described here but reference may be had to the above-mentioned Irish application for more detail.

In essence, the elastomeric copolymers are produced by polymerizing a mixture of monomers, as ethylene and propylene in the presence of an inert hydrocarbon solvent with a catalyst that comprises the reaction product of a metallo-alkyl compound of Groups I, II or III and a compound of a metal halide as vanadium chloride or vanadium oxychloride. The ratio of monomers, as ethylene to propylene, that is maintained during the polymerization will vary depending on the proportion of the respective monomers desired in the final elatsomer. This in turn will vary depending upon the ultimate formulation desired in the vulcanizate. In any case, in the preferred embodiments the elastomer may contain from about 20 mole percent to about 90 mole percent of ethylene units in the copolymer and still be useful in the formation of rubbers. Because the monomers do not polymerize at the same rate, i.e., ethylene polymerizes faster than propylene, the ratio of the starting mixture of monomer is not the same as that desired in the final product and this is one of the major considerations in selecting the starting monomer ratios to give a particular final product. Other considerations are the choice of catalyst components and their respective proportions and the polymerization conditions. By way of illustration, Table I indicates variations of ethylene units in the final elastomer as the ratio of ethylene to propylene in the starting monomer mixture is varied. For this table, polymerizations were conducted at 45–65° C. in n-heptane solvent and the catalyst was the reaction product of trihexylaluminum and vanadium oxychloride in a mole ratio of 3.0:1.

Table I

| Mole percent ethylene in feed gases | Mole percent ethylene in copolymer |
|---|---|
| 8.0 | 24.0 |
| 18.0 | 48.1 |
| 26.0 | 57.7 |
| 32.0 | 62.4 |
| 50.0 | 80.3 |

Other suitable alkyl aluminum compounds as the catalyst component include trioctylaluminum, trinonylaluminum, tridecylaluminum, triisobutylaluminum, and others. Preferably the alkyl radicals of the trialkylaluminum have more than 4 carbon atoms but not more than 16 carbon atoms. For economic reasons, the number of carbon atoms in the alkyl radicals preferably range from 4 to 10. The ratio of the aluminum compounds to the vanadium oxychloride or vanadium tetrachloride may vary widely but preferably the aluminum to vanadium mole ratio is greater than 2. The catalyst is simply prepared by mixing and reacting the catalyst components in a hydrocarbon solvent whereupon there is formed a reaction product which is the catalyst.

There are indications that suitable vulcanization may be achieved with sulfur, as one component, together with other selective components. However, the use of sulfur most often results in vulcanizates that have a repugnant and very obnoxious odor. The odor is particularly strong and offensive when the rubber is at elevated temperatures, as in the case of automobile tires that are heated during normal road usage. The present invention does not employ sulfur and thus the disadvantageous odor does not exist while at the same time vulcanizates are obtained that have desirable physical properties.

As previously indicated the elastomeric copolymer is first blended with a peroxide, hydroperoxide or azo compound and an unsaturated organic acid or an organic anhydride. The blend is then reacted at temperatures between 100° C. and 250° C. The resulting product is essentially an intermediate of the said acid or anhydride. For brevity and convenience this product will be referred to as "the intermediate."

The unsaturated carboxylic acids, and anhydrides, preferably contain double bonds between carbon atoms conjugated with double bonds of carbonyl groups. Representative of the more preferred carboxylic acids and anhydrides within this class are maleic acid, maleic anhydride, fumaric acid, acrylic acid, methacrylic acid, ethacrylic acid, vinyl acrylic acid, itaconic acid, itaconic acid anhydride, aconitic acid, methaconic acid, crotonic acid, alpha-methyl crotonic acid, cinnamic acid, citraconic acid, citraconic acid anhydride, and the like having up to 12 carbon atoms. The quantity of the acid or anhydride may vary a great detal depending upon the numerous variables that are involved and these variables will be discussed in greater detail later. Generally however, amounts in the order of 1 to 20% by weight of the elastomeric copolymer may be employed with amounts in the order of 5 to 15% by weight being used in the more preferred embodiments of the invention.

The other components needed to form the intermediate is a suitable free radical yielding activator selected from organic peroxides, hydroperoxides and azo compounds. Representative compounds within this class are benzoyl peroxide, chlorobenzoyl peroxide, di-tert-butyl peroxide, dicumyl peroxide, cumyl hydroperoxide, tert-butyl perbenzoate, tert-butyl hydroperoxide, methyl cyclohexyl hydroperoxide, tetralin peroxide, decalin peroxide, azo-isobutyric acid nitrile, diazo-aminobenzene, diazo thioether and the like. This component is employed in amounts ranging from 0.1 to 10% by weight of the elastomeric copolymer although amounts in the order of 1.0 to 5% by weight are suitable in most instances.

The blending of the several components comprising the blend may be accomplished by any conventional mixing or kneading technique at temperatures up to 80° C. usually, however, blending at about room temperature is adequate. A particularly suitable method of preparing the blend comprises mixing the solution of the elastomeric copolymer with solutions of the acid, or the anhydrid and the free radical yielding activator. This simply is accomplished by forming solutions of the various components and bringing them together and mixing them at the desired temperatures. Thereafter the solvents are separated by any means and the blend is recovered as a solid. Any suitable solvent for the selected components may be employed with aliphatic solvents being particularly preferred since they are separated from the final product at lower temperatures. The alternative procedure of preparing the blends, i.e., by kneading or mill rolling, would be more advantageously employed by manufacturers of vulcanized products since it is not as convenient to place the solid elastomeric copolymer in solution.

After the blend of the elastomeric copolymer, the acid or anhydride, and the free radical yielding activator is prepared, the resulting solid is reacted at temperatures between 100° C. and 250° C. The reaction at the elevated temperatures may take place in an oven or a molding press, for example. The product resulting from this reaction at elevated temperatures is the intermediate. The duration of the reaction will vary depending upon which of the several variables have been selected. In any case it is most preferred that the heat treatment be maintained until the activator, i.e., the peroxide, the hydroperoxide, or azo compound, has been entirely decomposed and this can be determined preliminarily by periodic analysis. Generally, however, the reaction time will range from about 10 minutes to about 3 hours. It is observed that it is more beneficial if the intermediate is prepared in the absence of molecular oxygen.

The thus prepared intermediate is then mixed with a polyvalent isocyanate or isothiocyanate to produce the novel compositions of this invention. Examples of isocyanates include tetramethylene diisocyanate, hexamethylene diisocyanate, p-phenylene diisocyanate, toluylene diisocyanate, xylylene diisocyanate, 1,5-naphthylene diisocyanate, p,p'-diisocyanatodiphenylmethane, p,p',p''-triisocyanato-triphenylmethane, 4,4'-diisocyanato - dicyclohexylmethane and the like. Also included are reaction products of polyhydric alcohols or phenols with diisocyanates such as the reaction product of 1 mol of glycerol or of 1 mol of trimethylolpropane with 3 mols of toluyl diisocyanate. Polyvalent isothiocyanates are represented by the sulfur analogues of the above isocyanates. Also included are compounds from which polyvalent isocyanates or isothiocyanates are formed on heating such as the corresponding urethanes or thio-urethants, respectively. Representative of these compounds are the products which are obtained, for example, by reacting isocyanates with phenols or with malonic acid dialkylesters and are relatively readily decomposed on heating. Other examples are polymers of polyvalent isocyanates which depolymerize on heating, and various other adducts which can be prepared from polyisocyanates by known methods.

The amount of the isocyanate or isothiocyanate that is employed may also be varied a great deal. Generally, it is better to provide sufficient radicals of the formula —N=C=X to react with each carboxyl radical of the acid or anhydride. This, however, is not absolutely required as the properties of the vulcanizate may be influenced considerably by varying the amounts of the isocyanate. In most cases amounts ranging from 1 to 50% by weight of the intermediate will produce the most desirable products.

Curing agents for isocyanates are well known in the art and any one of them may be employed in the compositions. Most preferred are tertiary amines such as triethylamine, benzyl dimethyl amine, triethanolamine, dimethylaminomethyl phenol, tris(dimethylaminomethyl) phenol, pyridine, and the like. The curing agents are employed in amounts ranging from 0.01 to 5% by weight of the polyvalent isocyanate or isothiocyanate.

The intermediate and the isocyanate may again be mixed by means of the usual mixing and kneading equipment or roller mills. Usually additional ingredients are added such as carbon black, anti-oxidants and/or other rubber chemicals that are used in the manufacture of vulcanizates. Mixing is effected at room temperature or moderately elevated temperature up to 60° C. The reaction between intermediate and isocyanate, i.e., the vulcanization, is preferably conducted at temperatures ranging from 80° C. to 250° C. in, for example, conventional molding presses. The vulcanization time may range from 10 minutes to several hours depending mainly on the vulcanization temperature.

To illustrate the various embodiments of the invention, the following tabulation gives various formulations and indicates the results obtained. The results indicated summarize the product quality in regard to the tensile strength, elongation at break, modulus of elasticity at 200% and 300% and the permanent set after break. From Table II it will be seen that a considerable variation in properties may be obtained by varying the ingredients, and their amounts. In the table, the intermediate is prepared by blending a solution of the copolymer with a solution of the acid, or anhydride, and the catalyst. The ingredients are based on 100 parts of the copolymer and are in percent by weight.

10% by weight based on the copolymer of free radical activator selected from the group consisting of organic peroxides, organic hydroperoxides and organo-azo compounds, each activator having a decomposition temperature below 250° C., and (3) 1–20% by weight based on the copolymer of a member selected from the group consisting of unsaturated carboxylic acids having up to 12 carbon atoms per molecule and anhydrides thereof, heating the mixture at a temperature of 100–250° C. for 10 minutes–3 hours until the activator is decomposed, whereby an intermediate reaction product is formed, and thereafter adding 1–50% by weight based on the intermediate, of an organic isocyanate having 2–3 radicals of the formula —N=C=X, wherein X is a member selected from the group consisting of sulfur and oxygen, and 0.01–5% by weight based on the isocyanate of a tertiary amine curing agent for the mixture so formed.

2. The process of claim 1 wherein the elastomeric copolymer contains from 24 to 80% of polymerized ethylene, the balance being polymerized propylene.

3. The process of claim 1 wherein the isocyanate is tetramethylene diisocyanate.

4. The process of claim 1 wherein the isocyanate is p-phenylene diisocyanate.

5. The process of claim 1 wherein the isocyanate is tetramethylene diisothiocyanate.

6. The process of claim 1 wherein the isocyanate is p,p'-diisothiocyanato-diphenylmethane.

7. A composition of matter prepared according to the process of claim 1.

*Table II*

| Intermediate | | | | | | Vulcanizate | | | | | |
|---|---|---|---|---|---|---|---|---|---|---|---|
| Copol. percent polymerized ethylene | Acid or anhydride (parts) | Catalyst (parts) | Reaction conditions | | | Isocyanate (parts) | Curing agent (parts) | Cure conditions | | | Product properties |
| | | | Time, min. | Temp., °C. | Press., kg./cm.² | | | Time, min. | Temp., °C. | Press., kg./cm.² | |
| 50 | MA (3) | Di-t-bu-peroxide (.6). | 50 | 150 | 35 | a (4.3) | Triethanol amine (.05). | 50 | 150 | 35 | Good. |
| 50 | MAn (3) | ---do--- | 50 | 150 | 35 | a (4.3) | ---do--- | 50 | 150 | 35 | Better. |
| 62 | MAn (3) | ---do--- | 50 | 150 | 35 | a (4.3) | ---do--- | 50 | 150 | 35 | Excellent. |
| 62 | PA (5) | Di-t-bu-hydroperoxide (1.0). | 40 | 160 | 35 | b | Triethyl amine (0.8). | 50 | 150 | 35 | Do. |
| 68 | PAn (5) | ---do--- | 40 | 160 | 35 | c (9) | ---do--- | 50 | 150 | 35 | Do. |
| 70 | CA (7) | Azo-isobutyric acid nitrile. | 40 | 160 | 35 | b (15) | Pyridine (0.1). | 50 | 150 | 35 | Good. |
| 75 | Acrylic acid (7). | ---do--- | 40 | 160 | 35 | e (3) | Triethanol amine (1.0). | 50 | 150 | 35 | Fair. |

MA=maleic acid; MAn=maleic anhydride; PAn=phthalic anhydride; and CA=crotonic acid.
a. Polymeric toluylene diisocyanate.
b. Tetramethylene diisocyanate.
c. p-Phenylene diisocyanate.
d. Tetramethylene diisothiocyanate (product is free of repugnant odor).
e. p,p'-Diisothiocyanato-diphenylmethane (product is free of repugnant odor).

From these examples and numerous others, it may be deduced that the best results are obtained when the copolymer contains from about 58 to about 66% polymerized ethylene and the acid is one that is capable of forming anhydrides; the corresponding anhydrides are equally suitable. The isocyanate or isothiocyanate is less critical as is the curing agent therefor and accordingly materials that are commercially available are preferred. These are some of the variables that may be considered as well as the conditions used to form the intermediate and the conditions used to vulcanize. Still other modifications will be readily suggested to persons skilled in the art which modifications may be adopted without departing from the spirit of the invention.

We claim as our invention:

1. The process comprising blending a mixture of (1) an elastomeric copolymer of at least two monomers consisting essentially of mono-alpha-olefin hydrocarbons having up to 6 carbon atoms per molecule, the copolymer being essentially free of ethylenic unsaturation, (2) 0.1–

8. Compositions of claim 7 wherein the elastomeric copolymer contains from 24 to 80% of polymerized ethylene, the balance being polymerized propylene.

References Cited by the Examiner

UNITED STATES PATENTS

| 2,634,256 | 4/53 | Sparks et al. | 260—78.4 |
| 2,765,297 | 10/56 | Heiligmann et al. | 260—88.1 |
| 2,867,608 | 1/59 | Landrum et al. | 260—77.5 |
| 2,912,414 | 11/59 | Schulthesis et al. | 260—75 |
| 2,918,446 | 12/59 | Serniuk et al. | 260—85.3 |
| 2,973,344 | 2/61 | Fasce | 260—94.96 |
| 3,012,016 | 12/61 | Kirk et al. | 260—88.1 |
| 3,084,141 | 4/63 | Krause | 260—94.96 |
| 3,087,912 | 4/63 | Wagner et al. | 260—67 |

LEON J. BERCOVITZ, *Primary Examiner.*

H. N. BURSTEIN, DONALD E. CZAJA, *Examiners.*